United States Patent
Gunther

(10) Patent No.: US 7,815,431 B2
(45) Date of Patent: Oct. 19, 2010

(54) ACTUATING DEVICE FOR SHUT-OFF NEEDLES IN INJECTION MOLDING DEVICES COMPRISING NEEDLE SHUT-OFF NOZZLES

(75) Inventor: Herbert Gunther, Allendorf (DE)

(73) Assignee: Gunther Heisskanaltechnik GmbH, Frankenberg (DE)

( * ) Notice: Subject to any disclaimer, the term of this patent is extended or adjusted under 35 U.S.C. 154(b) by 151 days.

(21) Appl. No.: 12/087,205

(22) PCT Filed: Dec. 1, 2006

(86) PCT No.: PCT/EP2006/011573

§ 371 (c)(1),
(2), (4) Date: Jun. 27, 2008

(87) PCT Pub. No.: WO2007/079836

PCT Pub. Date: Jul. 19, 2007

(65) Prior Publication Data

US 2009/0017154 A1 Jan. 15, 2009

(30) Foreign Application Priority Data

Dec. 28, 2005 (DE) .................. 20 2005 020 412 U

(51) Int. Cl.
*B29C 45/23* (2006.01)
(52) U.S. Cl. .............. 425/564; 264/328.9; 425/566
(58) Field of Classification Search .......... 425/562, 425/563, 564, 565, 566; 264/328.9
See application file for complete search history.

(56) References Cited

U.S. PATENT DOCUMENTS

| 3,582,157 A | 6/1971 | Hammon |
| 3,969,057 A | 7/1976 | Pierre |
| 4,497,621 A | 2/1985 | Kudert et al. |
| 6,113,381 A * | 9/2000 | Gellert et al. ............... 425/564 |
| 6,238,197 B1 | 5/2001 | Van Hout et al. |
| 6,461,143 B1 | 10/2002 | Voets |
| 7,134,868 B2 * | 11/2006 | Babin et al. ............ 264/328.15 |

FOREIGN PATENT DOCUMENTS

DE 1 906 921 9/1970

(Continued)

*Primary Examiner*—Tim Heitbrink
(74) *Attorney, Agent, or Firm*—Clark & Brody

(57) ABSTRACT

A drive system (10) for shutoff needles in injection molds fitted with needle shutoff nozzles comprises an elevation drive element (20) to which can be affixed at least two shutoff needles (16) of two needle shutoff nozzles, said elevation drive element being displaceable—between two longitudinally supported control rails (30) that can be moved in a first direction (R1)—in a second direction (R2) perpendicular to the first direction (R1), at least two glide elements (50) being configured in grooves (40) oblique to said first and second directions (R1, R2) running between the elevation drive element (20) and the control rails (30), said glide elements converting the first motion of the control rails (30) in the direction (R1) into an elevation motion imparted by the elevation drive element (20) in the second direction (R2). In order to assure in particular substantially maintenance free and durably reliable operation of all valve needles, the invention provides that components which move relative to one another and hence are exposed to wear, in particular the control rails (30) and/or the glide elements (50), are made at least in part of a self-lubricating or a diamantine material or are coated at least in part with a self-lubricating or diamantine material.

33 Claims, 4 Drawing Sheets

FOREIGN PATENT DOCUMENTS

| | | |
|---|---|---|
| DE | 23 57 962 | 5/1975 |
| DE | 0 548 823 | 6/1993 |
| DE | 196 11 880 | 10/1997 |
| DE | 197 20 927 | 11/1997 |
| DE | 102 02 924 | 8/2002 |
| EP | 1 025 974 | 8/2000 |
| EP | 1 184 152 A1 | 3/2002 |
| GB | 2 343 409 | 5/2000 |
| JP | 5-42568 | 2/1993 |
| JP | 2000-190367 | 7/2000 |

* cited by examiner

ACTUATING DEVICE FOR SHUT-OFF NEEDLES IN INJECTION MOLDING DEVICES COMPRISING NEEDLE SHUT-OFF NOZZLES

FIELD OF THE INVENTION

The present invention relates to a shutoff-needle drive system in injection molds fitted with shutoff needle nozzles and to injection molds.

BACKGROUND ART

Needle shutoff nozzles are used in injection molds to feed a flowable material at a predetermined temperature and high pressure to a separable mold insert. Most commonly they are fitted with pneumatically or hydraulically driven shutoff needles which periodically open and close gates in the mold insert. For that purpose each shutoff needle is supported in axially displaceable manner in the mold-side region of the injection mold and, in the nozzle-side region, passes preferably centrally through a flow duct for the material to be processed. The flow duct terminates in a nozzle element subtending a nozzle discharge aperture. In the closed position, the lower end of the shutoff needle engages a sealing seat constituted in the nozzle end or in the mold insert.

SUMMARY OF THE INVENTION

Many applications require that all shutoff needles move synchronously and that they be loaded at the same closing pressure, in particular when several mold inserts are simultaneously injection-molded in one mold.

In this respect the European patent document EP 0 790 116 A1 proposes affixing the shutoff needles of one group of nozzles to a common support plate implementing an excursion in the longitudinal direction of the shutoff needles. For that purpose the support plate is configured at its front end between two stationary stops and laterally between two guide strips themselves supported in longitudinally displaceable manner within a clamping plate and are fitted at their side faces with obliquely mounted glide blocks or cams. The said glide blocks or cams laterally engage the support plate which is fitted with oblique grooves. When the guide strips are reciprocated longitudinally by a drive means, the support plate carries out an associated up and down displacement. In this manner all shutoff needles affixed to the support plate carry out the same elevation displacement.

This design occurs the drawback that the oblique grooves of the support plate and the sliders guided therein are subjected to comparatively high wear in particular in the case of high operational rates. As a result, and regardless of lubricants and the like, many maintenance procedures and hence shutdowns take place. Operational and maintenance costs are commensurately high.

As regards an injection mold known from the German patent document DE 196 11 880 A1, which comprises several needle shutoff nozzles, each shutoff needle is affixed to a separate needle support element. Such elements are fitted at two mutually opposite flat faces with oblique guide cams engaging oblique guide grooves of forked slider frame. A cylindrical element is subtended underneath the flat faces at each needle support element and is supported in the manner of an elevation plunger in axially displaceable manner in a guide bush. When the thrust frame is moved to and fro, the individual needle support elements will be moved up and down perpendicular to the motion of said frame.

This design is problematical in that due to dimensional tolerances, precisely synchronous entry of the shutoff needles in the particular associated sealing seat cannot be assured. For that reason each shutoff needle is affixed by means of a resilient intermediate element to its needle support element: this feature raises both the costs of assembly and those of manufacture. Again high frictional forces between the guide cams and the slider frame are a drawback in this instance too.

The German patent document DE 199 07 116 A1 discloses a drive mechanism situated between two mold plates and used for diecast valve elements. The individual valve pins of a group of nozzles are affixed to a common valve pin plate fitted near its edge with guide bushes and able to glide up and down on guide bolts running parallel to the valve pins. Two drive bars are mounted on the valve pin plate and support on their sides several glide blocks. These glide blocks engage oblique grooves of two cams supported in longitudinally displaceable manner between the upper mold plate and each holding plate.

Sets of roller bearings are provided at the top and bottom to reduce the cam bar friction. However the conversion of adjustment motions into elevation motions of the valve pin plate is carried out by commonplace glide blocks that are exposed to high wear in the oblique grooves of the cam elements. Moreover affixed drive bars and the additionally needed retention plates significantly increase the design height of the drive system, as a result of which this drive system may be used only to a limited extent in small molds.

The objective of the present invention is to avert the above discussed and other drawbacks of the state of the art and to create a compact drive system for injection molds with needle shutoff nozzles, said drive system always synchronously displacing the valve needles and loading them with the same closing pressure. In particular the objective of the present invention strives for maintenance-free and lastingly reliable operation of valve needles which moreover shall be individually adjustable within said system. Again this drive system shall be designed using simple, economic means and be easily operated.

Regarding a drive system for shutoff needles of injection molds fitted with needle shutoff nozzles, where said system comprises an elevation drive element to which may be affixed two shutoff needles of two needle shutoff nozzles, said element being displaceable between two longitudinally displaceable control rails in a second direction transverse to the first direction, grooves of at least two glide elements being configured between two glide elements and running obliquely to the first and to the second directions, said grooves converting a displacement of the control rails along the first direction into an elevation displacement by the elevation drive element in the second direction, the present invention provides that the mutually touching components that are displaced relative to each other, in particular the control rails and/or the glide elements, shall be made at least in part of a self-lubricating material or at least are partly coated with such. Alternatively the mutually touching components moving relative to one another, in particular the control rails and/or the glide elements, may be made at least in part of diamantine material or be coated with it. The term "diamantine" herein denotes a material of pronounced hardness, such as a diamond, which assures commensurately high component wear resistance.

By affixing the valve needles on a common elevation drive plate, all valve needles perforce will be displaced synchronously and be loaded by the same closing pressure. The glide elements made of a self-lubricating material and being guided in the oblique grooves of the control rails and loaded by transverse forces assure lastingly reliable operation of all valve needles because the friction is minimized within the grooves. The same feature is attained when the glide elements are coated at least partly, in particular in segments, with a self-lubricating material, or when, alternatively, they are made at least in part of a diamantine material or coated with one.

The present invention provides furthermore that the length of the glide elements shall exceed the thickness of the elevation drive element. Latter accordingly is always guided in accurate manner, no concentrated loads arising within the oblique grooves. The glide elements are inserted sideways into the elevation drive element to prevent them from rotating or tilting.

In the present invention, the elevation drive element is constrained to move in the second direction and preferably it is configured between two stops. These stops are made at least in part of a self-lubricating material or at least are coated with it, whereby the friction between the elevation drive element and the stops is significantly reduced. Alternatively the stops also may be made at least in part of a diamantine material or be coated with it.

In order to match the drive system and the valve needles individually to the mold, the valve needles are individually adjustable in the second direction relative to the elevation drive element. In order to furthermore always assure synchronous adjustment and simultaneous displacement compensation, a further feature of the present invention provides that the valve needles shall be axially fixed in position and floating relative to the excursion plate.

Between the valve needles, the elevation drive element comprises at least one recess passing a flow duct of a distributor arm or the like.

In another embodiment mode of the present invention, the control rails are linked to a drive, in particular by means of a common thrust element which together with said control rails constitutes a U-shaped frame. The control rails and the thrust element are connected in frictional and/or mechanically interlocking manner. Optionally, however, they also may be integral.

The accurate guidance of the control rails is attained by sliding them between guide elements. Illustratively these guide elements are guide rails affixed to or in a clamping plate. At their lateral surfaces facing the guide rails, the control rails are fitted with slide strips guided in sliding manner in the guide rail grooves. In order to reduce the friction between mutually displaceable components in this instance too, the glide strips are made at least in part of a self-lubricating material or at least are partly coated with it. Alternatively the mutually displaceable components also may be made of diamantine material or be coated with it in order to reduce wear due to relative, touching motion.

In another embodiment of the present invention, the guide elements are guide plates. These plates are affixed to the mold and to the control rails and are fitted with glide elements in the region of the slide surfaces. The guide plates and/or the glide elements are made at least in part of self-lubricating material or at least coated with it, resulting in advantageous glide properties.

In especially simple manner the self-lubricating material is a bearing material such as an alloy of tin, of lead, of aluminum or of copper or a sintered metal. Bronze or sintered bronze are especially preferred.

If a diamantine material is used instead of a self-lubricating material, the surfaces of the diamantine material advantageously shall be polished into a specular surface to attain low surface roughness and a low coefficient of friction. The wear due to relative, touching motions between the pertinent components may be reduced further thereby.

Also, the components incurring wear because of relative, touching motion and in particular the glide elements preferably shall be exchangeable so they be replaceable at will with new components.

In an especial embodiment mode of the present invention, the drive system is configured within an injection mold, in particular in or on a clamping plate. For that purpose said clamping plate is fitted with a recess receiving the drive system and thus simplifying assembly.

Significant advantages are attained when the drive system is flush with the clamping plate. In this manner the injection mold height is reduced. Where required, at least two drive systems may be configured in parallel next to each other, both being served by a common drive.

BRIEF DESCRIPTION OF THE DRAWINGS

Further features, details and advantages of the invention are stated in the claims and discussed in the following illustrative embodiments shown in the appended drawings.

DETAILED DESCRIPTION OF THE INVENTION

Figure 1:
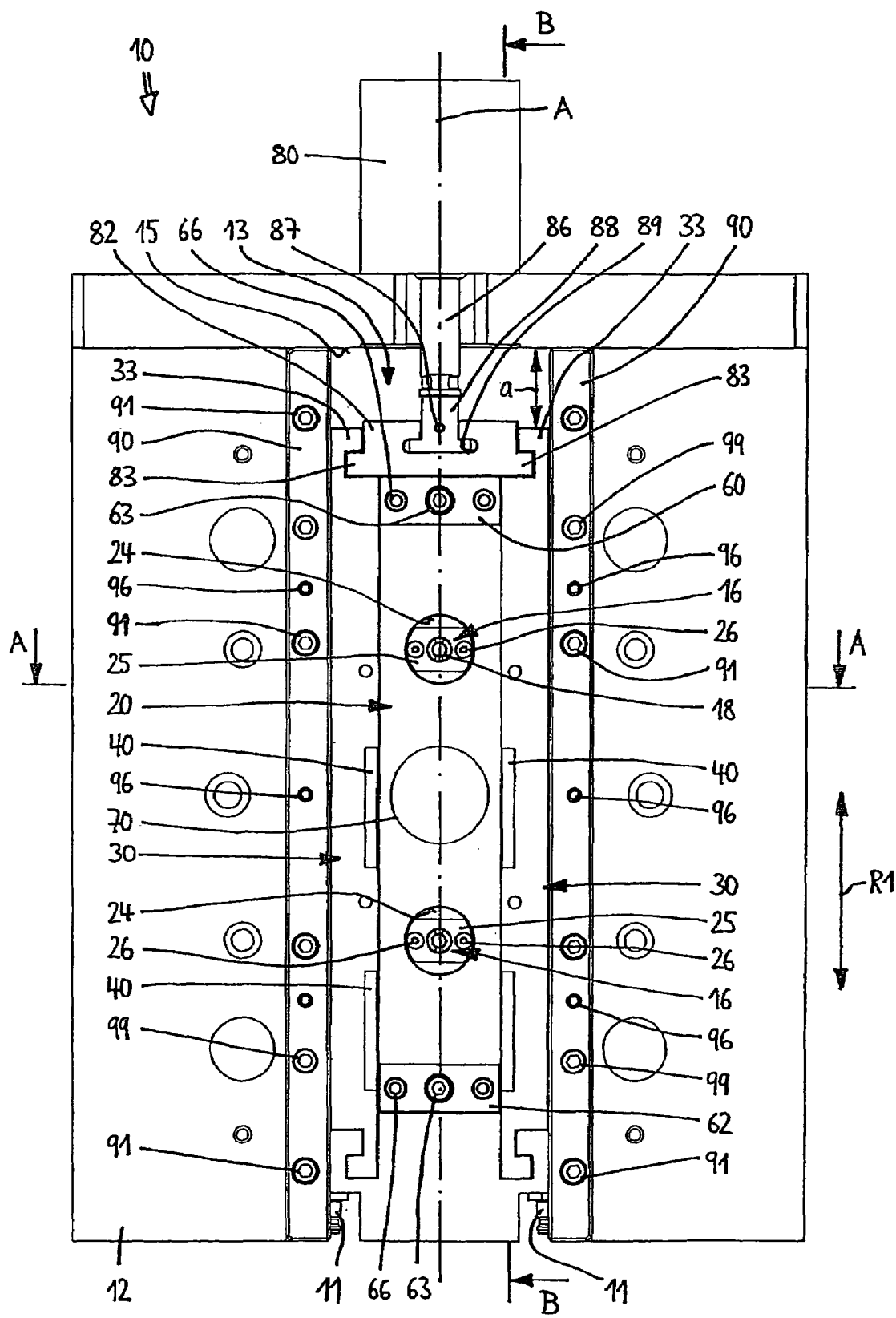
FIG. 1 is a top view of a drive system used for injection molds.

The drive system denoted as a whole by 10 in FIG. 1 is used to drive several shutoff needles 16 in injection molding equipment (not shown in further detail). Said equipment is used to manufacture molded parts from a flowable material, for instance a plastic melt. For that purpose, omitted needle shutoff nozzles are mounted underneath a manifold plate (omitted). Said needle shutoff nozzles move the plastic melt to be processed into a separable (omitted) mold insert of which the gates are periodically opened and closed by the shutoff needles 16.

A clamping plate 12 is configured above the manifold plate and is fitted with a rectangular recess or aperture 13 to receive the drive system 10. Hose or tube conduits of a flow medium moving in boreholes 17 through the clamping plate 12 can be connected to ports 11. In this manner both said clamping plate and the driving system 10 are always optimally temperature controlled, in particular cooled, with advantageous results for operation.

An elevation drive element 20 is used so that the shutoff needles 16 may be operated simultaneously and is fitted with two shutoff needles 16 affixed to it in the embodiment of FIG. 1. Preferably the elevation drive element 20 is a rectangular plate configured parallel to the clamping plate 12 and situated longitudinally between two displaceably supported control rails 30. At its ends, the drive element 20 is configured between two stationary stops 60, 62 affixed by screws 63 in the recess 13 of the clamping plate 12. Two dowel pins 66 each assure accurate alignment of the preferably cross-sectionally rectangular stops 60, 62, the dowels 66 being firmly affixed in the base 14 of the clamping plate 12 and being received by (omitted) boreholes in snugly seated manner in the stops 60, 62.

Figure 2:
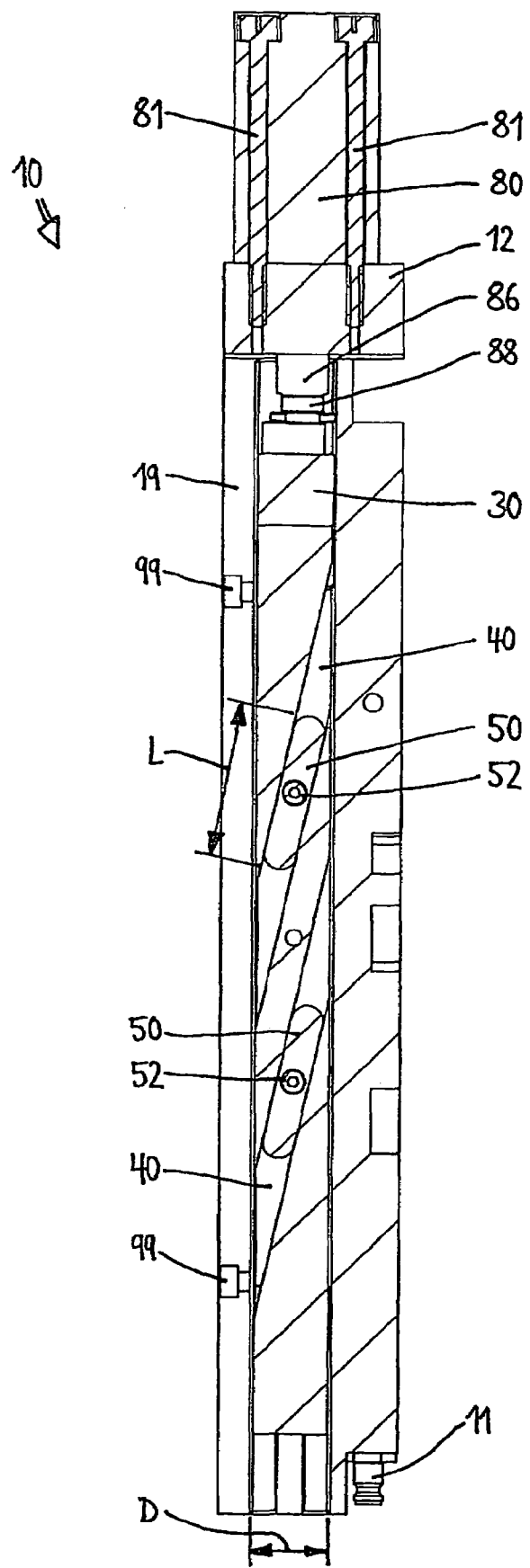
FIG. 2 is a sectional view of a drive system of FIG. 1 along line A-A.
Figure 3:
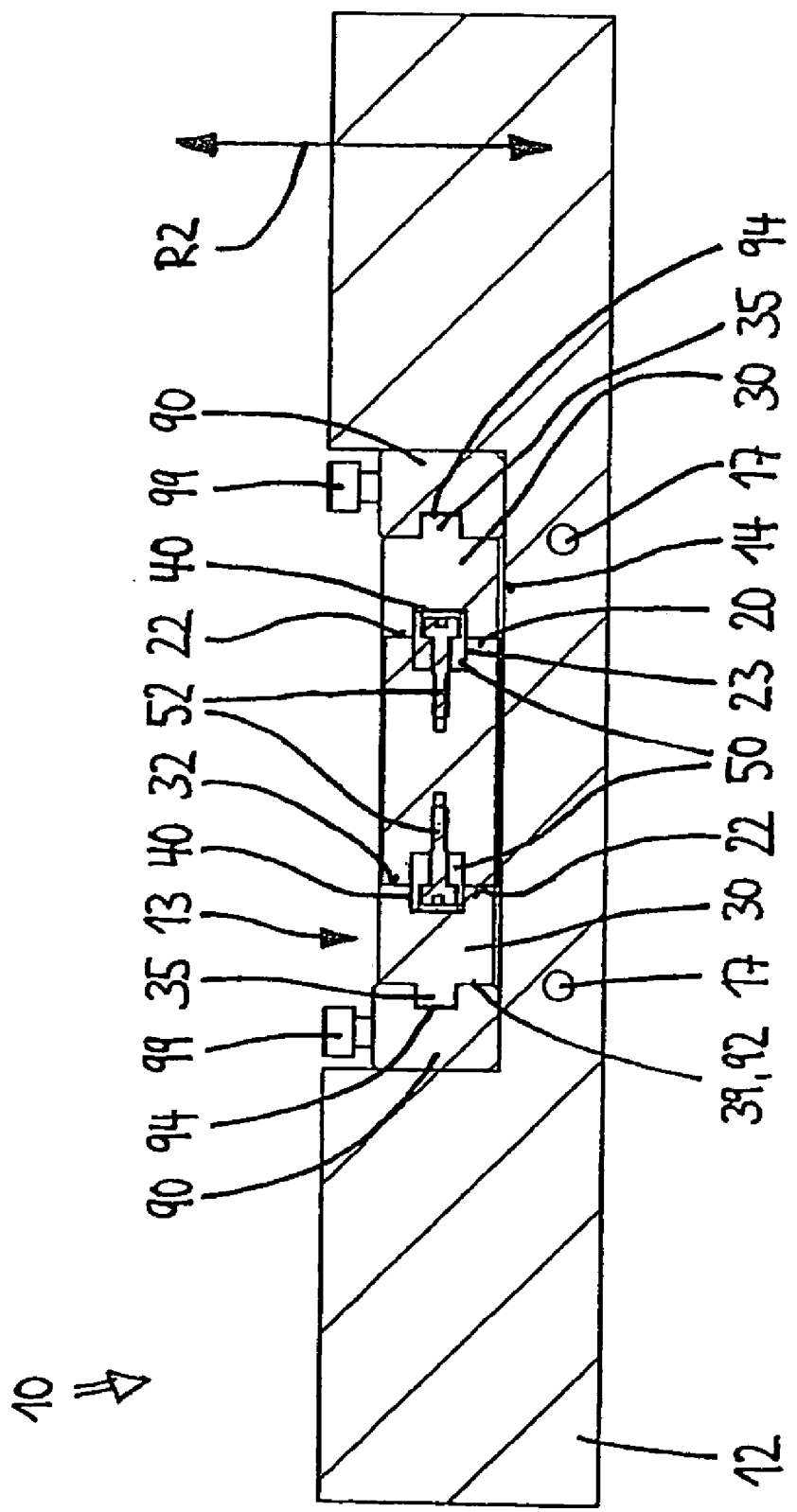
FIG. 3 is a sectional view of the drive system of FIG. 1 along line B-B.

The elevation drive plate 20 is fitted at each of its sides with two glide elements 50 guided parallel to one another in gliding manner in the control rails 30 (FIGS. 2 and 3). Said control rails are fitted at their lateral faces 32 facing the elevation drive plate 20 each with two grooves 40 running obliquely to the clamping plate 12, said grooves 40 receiving the glide elements 50 to within a slight play in displacement.

The control rails 30 are longitudinally displaceably configured within the recess 13 between two stationary guide rails 90 in a first direction R1 parallel to the clamping plate 12 and are connected by means of a common thrust plate 82 and an adapter 86 to a drive 80. This drive is externally affixed for instance by screws 86 to the clamping plate 12, the adapter 86 passing through a lateral (no further detail) borehole or aperture in the clamping plate 12. The drive 80 may be an electric, pneumatic or hydraulic adjusting device or a motor preferably driven by an omitted control electronics.

The thrust plate 82 comprises two stepped ends 83 engaging the control rails 30 in a manner that there shall always be a tension-resistant connection in the first direction R1 while being disengageable in the perpendicular direction thereto. For that purpose the control rails 30 are fitted with hooked ends 33 mechanically interlocking the stepped ends 83 of the thrust plate 82 by enclosing them. In this manner the elements 30, 82 may be plugged into each other during assembly of the drive system 10 without resorting to tools; this feature simplifies handling and is advantageous regarding assembly costs. Also the components 30, 82 always may be quickly exchanged, for instance when a long and/or wide elevation drive plate 20 is used. In the assembled state, however, the thrust plate 82 and the control rails 30 are always firmly linked in the drive direction R1.

The connection means between the thrust plate 82 and the adapter 86 constitutes a cross-sectionally T-shaped glide block 88 connected by a clamping pin 87 to the adapter 86 inserted—again without resort to tools—in mechanically interlocking manner into the thrust plate 82. Appropriately said elevation drive plate 82 is fitted with a matching hollow 89.

The guide rails 90 are laterally received in the recess 13 of the adapter plate 12. These rails are affixed by screws 91 to the base 14 of the recess 13 and are fitted at their side faces 92 opposite the control rails 30 each with a continuous guide groove 94 running parallel to the adapter plate 12. Each guide groove 94 receives—with little play—a glide strip 35 constituted at a side face 39 of the control rail 30 opposite the guide rails 90. Dowels 96 assure the guide rails 90 shall be accurately aligned within the recess 13. These dowels are firmly inserted into the base 14 of the clamping plate 12 as a tight fit into omitted boreholes in the guide rails 90.

FIG. 1 shows that the control rails 30 and the thrust plate 82 constitute a U-shaped frame laterally enclosing the elevation drive plate 20 and the stops 60, 62 at little displacement play and being guided in sliding manner outside between the guide rails 90. When the drive 80 periodically reciprocates the frame 30, 82 in the first direction R1, then the elevation drive plate 20 constrained to move between the stops 60, 62 will be periodically moved by the glide elements 50 guided in the oblique grooves 40 of the control rails 30 shall be moved up and down in a second direction R2 perpendicular to the direction R1. Accordingly the elevation drive plate 20, together with the shutoff needles 16 affixed to it, carries out an elevation motion in which all said shutoff needles 16 always are driven simultaneously and at the same closing power.

In order that the elevation drive plate 20 may carry out a defined and unfailingly reproducible elevation, the motion of the thrust element 82 in the first direction R1 is limited by stops. A first stop is constituted by an end wall 15 of the recess 13, whereas the stop 60 pointing toward the drive 80 constitutes a second stop. The separation "a" between the end wall 15 and the stop 60 predetermines the adjustment range of the thrust element 82 and hence for the control rails 30 which as a result may be reciprocated between at least two defined positions. Depending on the oblique position of the grooves 40 and the glide elements 50, the elevation drive plate 20 carries out a correspondingly defined change in elevation, the drive 80 also controlling motions into intermediate positions when illustratively the shutoff needles 16 must be moved into various closed and open positions.

The plug-in connector means between the components 30, 82 and 82, 86/89 offer the advantage that the illustratively pre-mounted drive system is insertable in simple manner from above into the recess 13 of the stop plate 12. Only the stops 60, 62 already were inserted into the recess 13. Accordingly the entire drive system 10 consists only of a few parts of simple geometry. Its installation is very simple. Vice-versa, the elevation drive element 20, the control rails 30, the thrust element 82 and the guide rails 90 always can be quickly and conveniently removed from the clamping plate 12 for instance to replace defective components, to change the shutoff needles 16 or to carry out other maintenance work.

The glide elements 50 of the elevation drive plate 20 preferably are elongated feather keys running at the same angle to the clamping plate 12 as the grooves 40 of the control rails 30. Moreover they are received in the lateral faces 22 of the elevation drive plate 20 and are each secured therein by one or two screws 52. For that purpose the elevation drive plate 20 is fitted with corresponding recesses 23 receiving the feather keys 50 in mechanically interlocking manner.

To assure appropriate guidance of the mutually parallel feather keys 50 in the grooves 40 of the control rails 30 and to enable high force transmission, the length of each feather key 50 exceeds the thickness D of the elevation drive plate 20. As a result the control rails 30 are provided with a sufficiently large engagement surface to move the elevation drive element 20 into its up-and-down motions. This feature also favorably affects service life.

In order to furthermore reduce to a minimum the friction within the grooves 40, the feather keys 50 of one embodiment mode of the invention are made of a self-lubricating material, preferably a bearing material, for instance bronze or sintered bronze. In addition or alternatively, the glide strips 35 of the control rail 30 and/or the stops 60, 62 which make frictional contact with the elevation drive plate 20 also may be made of a self-lubricating material, the glide strips 35 being affixed by omitted screws to the control rails 30.

As a result, the drive system 10 needs almost no lubricant and enjoys therefore lengthened intervals between maintenance. The drive system 10 assures a lastingly reliable elevation displacement of all valve needles 16.

In another important embodiment mode, the present invention provides that the slide and guide elements 35, 50, 60, 62 are made of steel and are coated (not shown in further detail) with a self-lubricating material. In this manner too the manufacturing costs may be reduced while simultaneously the drive system needs less maintenance. The components 35, 50, 60, 62 may be coated in full with a self-lubricating material or merely in the areas of their contact/friction surfaces. The simple, plug-in design of the drive system 10 allows rapidly and conveniently exchanging components of which the coating has worn or was damaged.

Alternatively components that touch and are moving relative to each other may be made at least in part of a diamantine material or be at least partly coated with it. Because of this diamantine material, the pertinent components are made highly wear resistant and therefore offer long life. Preferably the slide surfaces along which said relative, touching motion takes place are additionally polished to lower the surface roughness and commensurately the coefficient of friction.

Figure 4:
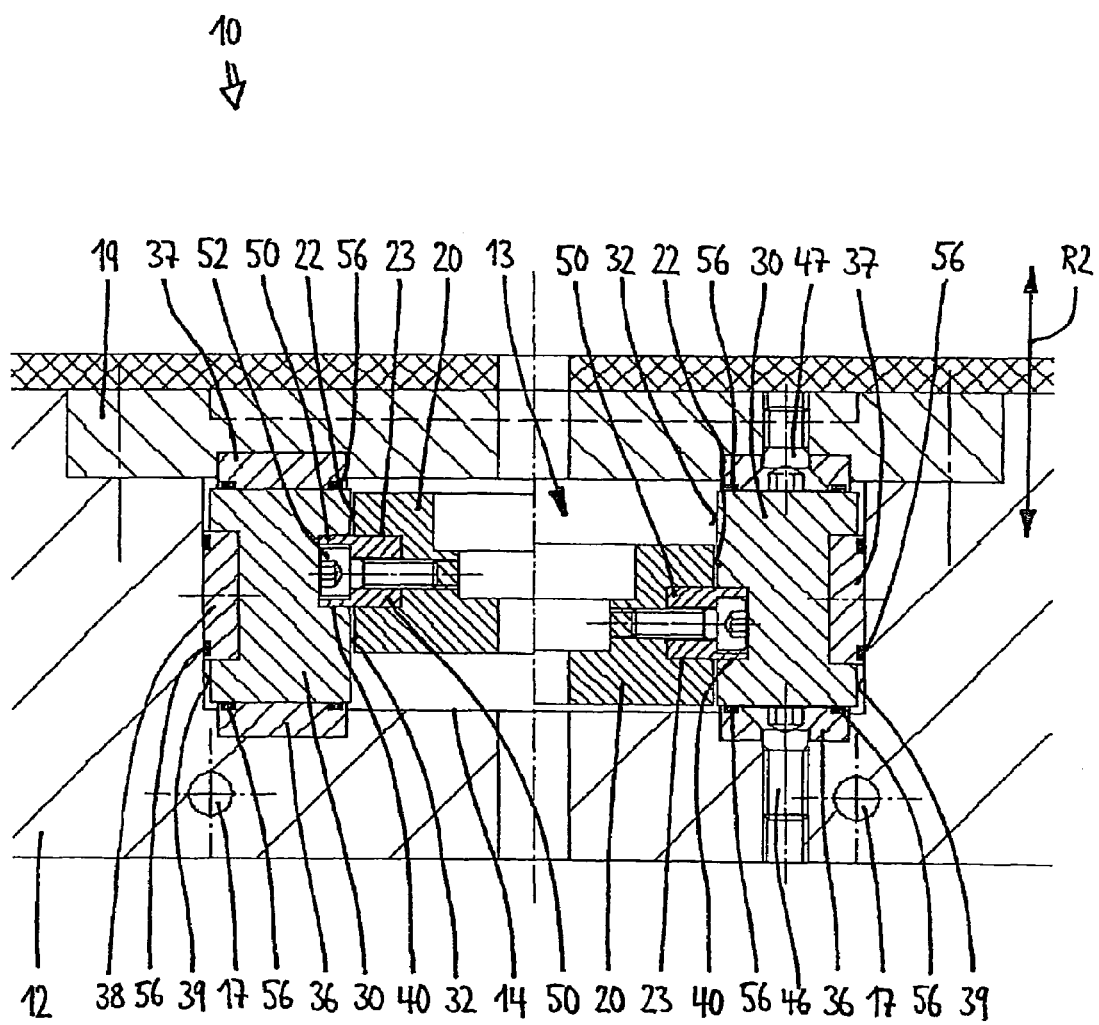
FIG. 4 is a sectional view of another embodiment mode of a drive system used for injection molds.

The embodiment mode of FIG. 4 provides that each guide rail 30 between three guide plates 36, 37, 38 be displaceably supported. Two of these plates 36 are affixed by screws 46 to the base 14 of the recess 13 whereas two upper plates 37 are affixed by screws 47 to cover plate 19. Two further plates 38 each are inserted into the side face 39 of the guide rails 30 which for this purpose are fitted with grooves not further discussed. The side plates 38 and the guide rails 30 are firmly screwed into each other.

As furthermore shown in FIG. 4, the upper and lower plates 36, 37 are fitted with glide elements 56 made of a self-lubricating material at their gliding respectively frictional surfaces facing the guide rail 30. Such glide elements 56 also are inserted into the outer surfaces of the lateral guide plates 38 facing the clamping plate 12. The guide plates 36, 37, 38 offer the advantage that the guide rails 30 shall always be guided accurately and reliably within the clamping plate 12 while the glide elements 56 assure low friction and commensurately low wear.

However, and just as are the glide and guide elements 35, 50, 60, 62, the glide faces of the plates 36, 37, 38 also may be fitted with a coating of a self-lubricating material. Or else, the plates 36, 37, 38 are entirely made of a self-lubricating material; and combinations of all such variations are applicable. Alternatively a diamantine material may be used for said components, the glide faces advantageously being polished for the reasons already discussed above.

The self-lubricating material used to make the elements 35, 50, 56, 60, 62 and/or used to coat them may be an alloy of lead, of tin, aluminum or copper or a sintered metal. The essential point is that the material offer self-lubricating properties in order to lower the comparatively high friction at the glide faces. At the same said material must be of adequate strength to preserve the benefits of long-term self-lubrication.

The shutoff needles 16 are inserted centrally to the longitudinal axis A from above into the elevation drive plate 20 which is fitted for this purpose with omitted boreholes. In the vicinity of the elevation drive plate 20, each needle 16 is fitted at its end with a thread which is screwed into an omitted, substantially rectangular support plate. An adjusting nut 18 fastens the needle 16 in position relative to the support plate resting flat on the elevation drive plate 20. In this manner the needles 16 are individually and longitudinally adjustable in the second direction R2 relative to the elevation drive plate 20.

Each support plate is situated in an omitted recess of which the height is nearly that of the holding plate and of which the outer dimensions exceed that of said plate, as a result of which this plate is able to move radially within said recess. A cover plate 25 affixed by screws 26 to the elevation drive plate 20 secures this support plate in said recess. Accordingly, within the least possible play in displacement in the axial direction of the shutoff needles 16, the support plate is affixed between the elevation drive plate 20 and the cover plate 25, and accordingly all the needles 16 always can be moved accurately into their closed positions and then be reopened again. On the other hand the support plates are floatingly supported in the radial direction, and as a result, position deviations of the needles 16 within the hot runner nozzles during excursion motions can be compensated. On account of the rectangular design of the support plate, the needles 16 moreover are irrotational relative to the elevation drive plate 20.

The needles 16 project by their adjusting nuts 18 through the cover plates 25. To preclude the needle ends from excessively protruding above the elevation drive plate 20, the support plates and the cover plates 25 are configured in recesses 24. In this manner the design height of the drive system 10 remains extremely low.

A central aperture 70 is constituted centrally between the recesses 24 in the elevation drive plate 20 and extends at the same inside diameter into the clamping plate 12. The aperture 70 is crossed by a flow duct of a manifold arm or the like, in particular an omitted mold nozzle or a feed bush feeding the plastic to be processed to the manifold plate situated underneath the clamping plate 12. The omitted inside diameter of the aperture 70 is selected in a manner to allow unhampered displacement of the elevation drive plate 20.

The drive system 10 is closed by a cover plate 19 (FIG. 2) lying flat on the guide rails 90 to which it affixed by screws 99. As indicated in FIG. 3, the cover plate 19 closes flush with the top side of the clamping plate 12, as a result of which the drive system 10 does not project above said clamping plate 12. Instead the system 10 is nearly fully integrated into the clamping plate 12 with very advantageous consequences regarding the mold's design height. Only the drive 80 is situated externally and on the side of the clamping plate 12, without however affecting its height.

In the embodiment mode of FIG. 1, two shutoff needles 16 of a group of needles are affixed to the elevation drive element 20. However the number of shutoff needles 16 may be increased without difficulty by designing the elevation drive plate 20 to be commensurately longer or wider. The shutoff needles need not be mandatorily configured on the longitudinal axis A either. To most efficiently utilize the given mold surface, several mold inserts and hence several needle shutoff nozzles may be configured tightly near one another, and the nozzles where called for may be combined in groups of nozzles.

Conceivably too, two drive systems 10 may be configured side by side. For that purpose then the clamping plate 12 shall be fitted with two adjoining recesses 13 or with a common recess, as a result of which the control rails 30 and the guide rails 90 of the individual drive systems 10 shall be configured parallel to each other.

The present invention is not restricted to one of the above described embodiment modes, instead it may be varied in many ways. Illustratively the control rails 30 and the thrust element 82 also may be linked frictionally to one another, for instance using omitted snap-in elements. However the control rails 30 and the thrust element 82 also may be integral, as a result of which the U-shaped frame may be assembled/dismantled as one unit.

The glide and guide elements 35, 36 37, 38, 50, 60, 62 need not mandatorily be coated with the self-lubricant material or alternatively with diamantine material. The corresponding material also may be deposited on an intermediate support, for instance on a laminar substrate element which shall be affixed to the frictional surfaces of the glide and guide elements 35, 36, 37, 38, 50, 60, 62, for instance by screws, interlocking or bonding.

All features and advantages implicit and explicit in the appended claims, the specification and the drawing, inclusive details, spatial configurations and method steps, may be viewed being inventive per se and also in arbitrary combinations.

The invention claimed is:

1. A drive system (10) for shutoff needles in an injection mold fitted with needle shutoff nozzles, comprising an elevation drive element (20) to which is affixed at least two shutoff needles (16) of two needle shutoff nozzles and which are displaceable between two control rails (30) supported in longitudinally displaceable manner in a first direction (R1) in a second direction (R2) transverse to the first direction (R1), with at least two glide elements (50), said of two glide elements converting a displacement of the control rails (30) along the first direction (R1) into a vertical excursion of the elevation drive element (20) in the second direction (R2), characterized in that the drive element (20) is situated longitudinally between the control rails (30);
in that the glide elements (50) are configured between the elevation drive element (20) and the control rails (30), in grooves (40) oblique to the first direction (R1) and to the second direction (R2); and
wherein at least the control rails (30) and/or the glide elements (50) as components moving relative to one another and thereby exposed to wear are made at least in part of a self-lubricating or a diamantine material or are coated at least in part with a self-lubricating or a diamantine material.

2. Drive system as claimed in claim 1, characterized in that the length (L) of the glide elements (50) is larger than the thickness (D) of the elevation drive element (20).

3. Drive system as claimed in claim 1, characterized in that the glide elements (50) are inserted laterally in the elevation drive element (20).

4. Drive system as claimed in claim 1, characterized in that the elevation drive element (20) is guided in a constrained manner along the second direction (R2).

5. Drive system as claimed in claim 4, characterized in that the elevation drive element (20) is configured between two stops (60, 62).

6. Drive system as claimed in claim 4, characterized in that the stops (60, 62) are made at least in part of a self-lubricating or of a diamantine material or are at least coated in part with a self-lubricating or a diamantine material.

7. Drive system as claimed in claim 1, characterized in that the valve needles (16) are adjustable along the second direction (R2) relative to the elevation drive element (20).

8. Drive system as claimed in claim 1, characterized in that the valve needles (16) are affixed in axially stationary and radially floating manner to the elevation drive plate (20).

9. Drive system as claimed in claim 1, characterized in that the elevation drive plate (20) comprises at least one aperture (70) crossed by flow duct of a manifold arm or the like of the injection mold.

10. Drive system as claimed in claim 1, characterized in that the control rails (30) are linked to a drive (80).

11. Drive system as claimed in claim 10, characterized in that the control rails (30) are linked by a common thrust element (82) to the drive (80).

12. Drive system as claimed in claim 10, characterized in that the control rails (30) and the thrust element (82) constitute a U-shaped frame.

13. Drive system as claimed in claim 10, characterized in that the control rails (30) and the thrust element (82) are connected to each other frictionally and/or in mechanically interlocking manner.

14. Drive system as claimed in claim 10, characterized in that the control rails (30) and the thrust element (82) are integral.

15. Drive system as claimed in claim 1, characterized in that the control rails (30) are guided in gliding manner between guide elements (36, 37, 38, 90).

16. Drive system as claimed in claim 15, characterized in that the guide elements are two guide rails (90).

17. Drive system as claimed in claim 16, characterized in that the guide rails (90) are affixed on or in a clamping plate (12).

18. Drive system as claimed in claim 16, characterized in that the control rails (30) are fitted with glide strips (35) at their sides facing the guide rails (90), said strips being guided in gliding manner in grooves (94) of the guide rails (90).

19. Drive system as claimed in claim 15, characterized in that the glide strips (35) are made at least in part of a self-lubricating or a diamantine material or are coated at least partly with a self-lubricating or a diamantine material.

20. Drive system as claimed in claim 15, characterized in that the guide elements are guide plates (36, 37, 38).

21. Drive system as claimed in claim 20, characterized in that the guide plates (36, 37, 38) are fitted with glide elements (56).

22. Drive system as claimed in claim 20, characterized in that the guide plates (36, 37, 38) and/or the glide elements (56) are made at least in part of a self-lubricating or a diamantine material or are at least partly coated with a self-lubricating or a diamantine material.

23. Drive system as claimed in claim 1, characterized in that the self-lubricating material is a bearing material.

24. Drive system as claimed in claim 23, characterized in that the self-lubricating material is an alloy of lead, of tin, of aluminum or of copper or a sintered metal.

25. Drive system as claimed in claim 23, characterized in that the self-lubricating material is bronze or sintered bronze.

26. Drive system as claimed in claim 1, characterized in that the surface of the diamantine material is polished.

27. Drive system as claimed in claim 1, characterized in that components incurring wear due to relative, touching motion between them, in particular the glide element (50), are mounted in exchangeable manner.

28. An injection mold comprising at least one drive system (10) defined in claim 1.

29. Injection mold as claimed in claim 28, characterized in that the drive system (10) is constituted within or on a clamping plate (12).

30. Injection mold as claimed in claim 29, characterized in that the clamping plate (12) is fitted with a recess (13) receiving the drive system (10).

31. Injection mold as claimed in claim 28, characterized in that the drive system (10) terminates flush with the clamping plate (12).

32. Injection mold as claimed in claim 28, characterized in that at least two drive systems (10) are configured parallel and next to each other.

33. Injection mold as claimed in claim 32, characterized in that the drive systems (10) are fitted with a common drive (80).

* * * * *